April 25, 1933. W. E. LANDSMAN 1,905,723
VIBRATION DAMPING DEVICE
Filed Sept. 9, 1931
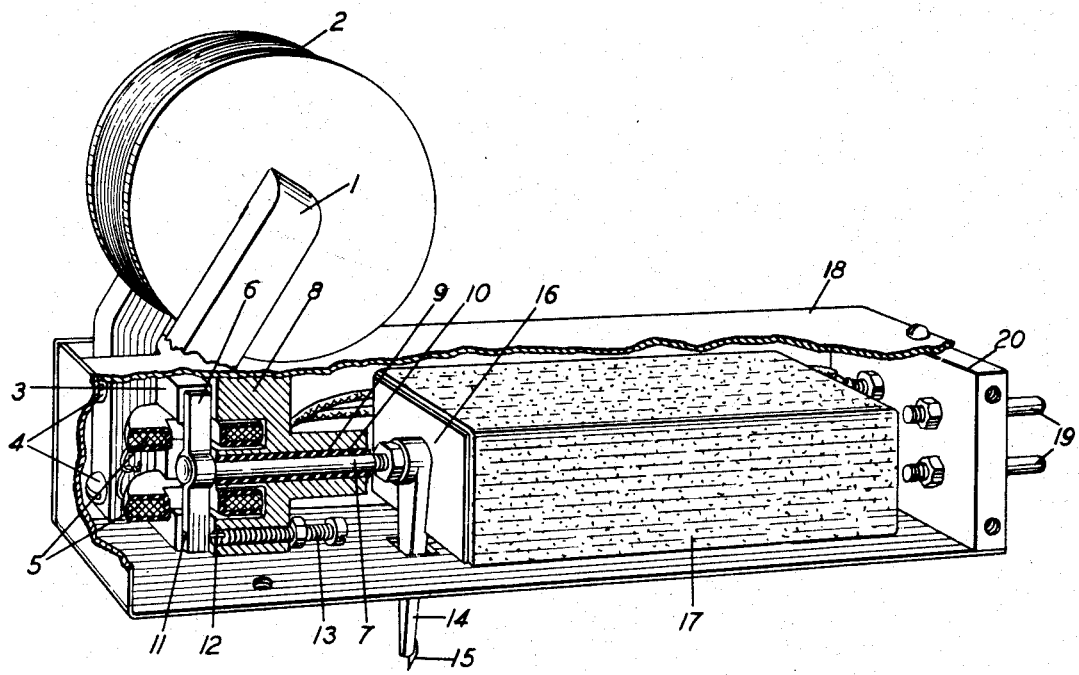
INVENTOR
W. E. LANDSMAN
BY
ATTORNEY Patented Apr. 25, 1933

1,905,723

UNITED STATES PATENT OFFICE

WESLEY E. LANDSMAN, OF CEDAR GROVE, NEW JERSEY, ASSIGNOR TO BELL TELEPHONE LABORATORIES, INCORPORATED, OF NEW YORK, N. Y., A CORPORATION OF NEW YORK

VIBRATION DAMPING DEVICE

Application filed September 9, 1931. Serial No. 561,820.

This invention relates to damping devices for mechanical vibrating systems and the object of the invention is to provide a very simple, compact and inexpensive means for absorbing the excess energy of vibratory systems such as are used in electrical recorders.

The general requirements of damping devices for this purpose are well understood and in Patent 1,663,884 to Harrison, March 27, 1928 there is disclosed one such structure in the form of a tube of rubber extending from the recorder armature shaft along the supporting arm toward the pivot. Such a tube must be rather long to prevent reflection effects and although capable of functioning satisfactorily it is rather expensive to make and assemble properly in the recorder.

Applicant has discovered, however, that for inexpensive recorders the operation of these carefully designed vibration absorbing devices can be simulated with sufficient accuracy for many purposes by using a small block of reclaimed rubber secured to the moving system of the recorder. This rubber is made up of a number of thin sheets pressed together and has very different physical properties from ordinary rubber. It has very high internal viscosity and hence a short length of this material exerts as much damping effect as a longer section of ordinary rubber. The ratio of the stiffness of the material to its internal viscosity is particularly suitable for this application and the proper mass of the piece of rubber required in each case can be readily determined experimentally by starting with a piece somewhat larger than required and removing successive layers until the desired effect is obtained.

In the drawing, there is illustrated one form of an inexpensive recorder incorporating a damping device according to this invention.

This recorder is of the balanced armature type and has a magnetic circuit similar to the recorder of the Harrison patent referred to above. The armature mounting and biasing arrangements, however, are very much simpler and less expensive as will be apparent from the following detailed description. The U-shaped magnetic member 1 may be a permanent magnet or the core of an electromagnet in which a flux is set up by a steady current in the coil 2. Pole pieces 3, 3 only one of which is shown in the sectional view are secured to the ends of the member 1 by screws 4, 4 and have recesses for receiving the coils 5, 5 which carry the varying currents representing the sounds to be recorded.

The armature 6 is mounted on a shaft 7 and adapted to be vibrated between the pole pieces 3 by the varying currents in the usual manner. Secured to the pole pieces is a non-magnetic member 8 having a longitudinal hole 9 containing a rubber tube 10 into which the shaft 7 fits tightly and which provides a satisfactory bearing for the shaft. The armature is biased to the mid-position between the pole pieces by a steel biasing pin 11 projecting into an eccentric hole 12 in the set screw 13 with a sliding fit so that, as more clearly explained in a copending application of G. R. Yenzer, Serial No. 561,865, filed Sept. 9, 1931, one or more complete turns of the screw 13 will vary the free length and hence the effective stiffness of the biasing pin and a fractional turn, due to the eccentricity of the hole 12, will center the armature between the pole pieces.

To the other end of the shaft 7 there is attached a stylus arm 14 which carries a suitable cutting stylus 15 and a rectangular plate 16. To this plate is cemented the oblong block 17 of reclaimed rubber to dampen the movements of the stylus as explained above. For the type of recorder shown, it has been found that very good results may be obtained when this block is about 2 inches long, ¾ inch wide and ⅝ inch thick.

Due to the inertia of the block, the oscillations of the shaft 7 will set up torsional stresses in the rubber which is of such high internal viscosity that the excess energy of vibration not required for cutting purposes by the stylus is absorbed as heat in the rubber so that the frequency response of the recorder is substantially flat for important speech frequencies.

The assembled structure just described is preferably enclosed in a suitable casing 18 and held in place to provide working clearance between the casing and the rubber block 17 by set screws (not shown) engaging the non-magnetic member 8. The leads for the coils 2 and 5 are secured to studs 19 in the end-plate 20 and these studs form both a mechanical and an electrical connection between the recorder and its supporting arm.

It will be understood of course that the invention is independent of the particular size and configuration of the rubber block shown and that due to the laminated nature of the material the optimum size of the block can be readily determined experimentally in each case. The invention has been described as applied to an electrical recorder but it will be clear that such a damping device is equally applicable to other vibratory systems within the scope of the following claims.

What is claimed is:

1. In a vibration translating device a vibrating member and means for receiving and dissipating the excess energy of the member comprising a solid block of reclaimed rubber supported solely by being attached at one end to and adapted to be vibrated torsionally by the member.

2. A solid medium for receiving and dissipating the excess energy of a vibrating member comprising a solid oblong block of reclaimed rubber free at one end and attached to and adapted to be torsionally vibrated by the member.

3. A solid medium for receiving and dissipating vibratory energy comprising an oblong block of laminated reclaimed rubber supported at one end only and adapted to be vibrated torsionally.

In witness whereof, I hereunto subscribe my name, this 8th day of September, 1931.

WESLEY E. LANDSMAN.